(12) United States Patent
Recker

(10) Patent No.: US 7,292,187 B2
(45) Date of Patent: Nov. 6, 2007

(54) DETERMINING A POSITION OF AT LEAST ONE BEACON IN A LOCATION SYSTEM

(75) Inventor: John Ludd Recker, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 403 days.

(21) Appl. No.: 11/009,099

(22) Filed: Dec. 10, 2004

(65) Prior Publication Data

US 2006/0125693 A1 Jun. 15, 2006

(51) Int. Cl.
*G01S 3/02* (2006.01)
(52) U.S. Cl. ....................... 342/458; 342/463
(58) Field of Classification Search ............... 342/463, 342/458, 357.02, 464
See application file for complete search history.

(56) References Cited

U.S. PATENT DOCUMENTS 3,863,256 A * 1/1975 Smith .................... 342/451
6,745,036 B1 * 6/2004 Dunne et al. ............ 455/456.1

OTHER PUBLICATIONS

Bahl, P. et al., "RADAR: An In-Building RF-Based User Location and Tracking System", Microsoft Research, undated.
Nissanka, P.B. et al., "The Cricket Location-Support System", MIT Laboratory for Computer Science, MA, 2000.

* cited by examiner

*Primary Examiner*—Thomas H. Tarcza
*Assistant Examiner*—Nga X. Nguyen

(57) ABSTRACT

A position for a beacon in a location system is determined based on distances measured from positions in a local coordinate system for the location system and from intersection points of circles. The circles each have a center point of one of the positions in the local coordinate system and a radius of one of the measured distances.

18 Claims, 12 Drawing Sheets

DETERMINING A POSITION OF AT LEAST ONE BEACON IN A LOCATION SYSTEM

TECHNICAL FIELD

The technical field relates generally to location systems, and more particularly for determining the position of at least one beacon for the location system.

BACKGROUND

Location systems for determining the position of a mobile device relative to the location system's infrastructure are an active area of research. Two types of location systems being researched are active and passive systems. Active systems include a mobile device broadcasting signals that can be used by a passive listening infrastructure to track the position of the mobile device. Passive systems include an active infrastructure broadcasting signals into the environment, and a passive mobile device uses these signals to derive its position. Passive location systems have emerged as the paradigm of choice for user location systems due to both reduced power consumption and privacy concerns. For example, with regard to privacy, a passive location system allows a user to identify their position in the system at the user's convenience, and the infrastructure does not or cannot necessarily track the user.

A mobile device in a passive location system may determine its position within the location system, for example, by first determining the positions of beacons in the system and then using triangulation algorithms and the beacon positions to derive its current position. Thus, in a passive system, generally the positions of the beacons need to be determined before the passive location system can be used for position determination. Known techniques for determining positions of the beacons include manually measuring distances between each beacon. These techniques tend to be labor-intensive and time consuming, especially during set-up of a location system with a large number of beacons. Furthermore, after installation is complete the location system may be grown or modified. Using the known techniques for determining positions of the beacons to grow or modify the location system would again be time consuming and costly.

SUMMARY

A position of at least one beacon in a local coordinate system for a location system is determined by measuring a first distance from a first known position in the local coordinate system to a first beacon. A second distance from a second known position in the local coordinate system to the first beacon is also measured. First and second circles centered in the local coordinate system at the first and second known positions respectively and having radii of the first and second distances respectively are determined. The intersection points of the first and second circles in the local coordinate system are identified, and one of the intersection points is selected as a position of the first beacon in the local coordinate system.

BRIEF DESCRIPTION OF THE DRAWINGS

The embodiments described herein are illustrated by way of example and not limitation in the accompanying figures in which like numeral references refer to like elements, and wherein.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

According to different embodiments, systems and methods are described below that provide for the rapid deployment of beacons for a location system using efficient position determination techniques for determining the positions of beacons to be utilized by the location system. Manually measuring distances between beacons to determine the position of the beacons in the location system is minimized by using a mobile device to measure distances between beacons.

For purposes of describing the embodiments, first a passive location system and an example of an application for a passive location system are described. Then, determining the positions of the beacons and building a position database, such as during set-up of the passive location system are described. It will be apparent to one of ordinary skill in the art that the embodiments described herein may be used with location systems other than the passive location system described with respect to FIGS. 1 and 2. Furthermore, the embodiments for determining the positions of beacons and building a position database may be used when an existing location system is modified, such as when a beacon is added, removed or relocated, as well as during initial set-up of a location system.

Figure 1:
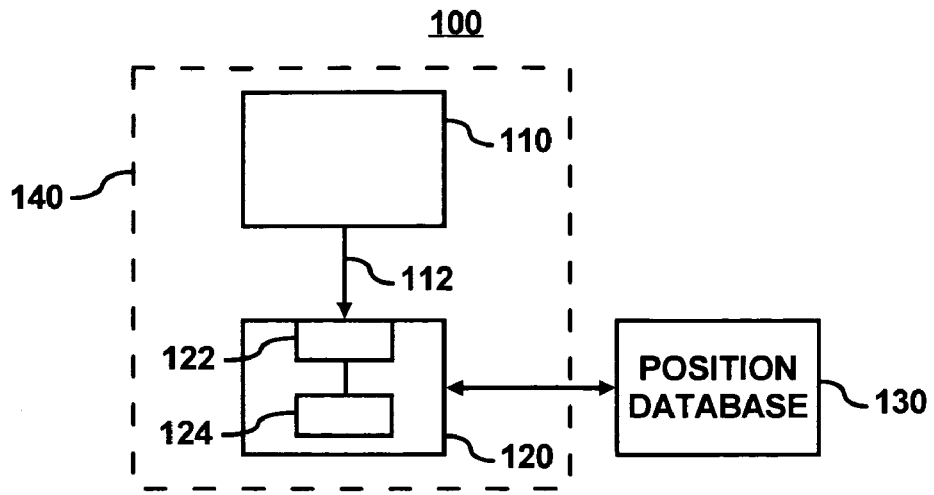
FIG. 1 illustrates a block diagram of a passive location system, according to an embodiment.

FIG. 1 illustrates a block diagram of a passive location system 100, according to an embodiment. The system 100 includes beacons 110, a mobile device 120, and a position database 130. The mobile device 120 is operable to determine its position in the system 100 using the beacons 110. The mobile device 120 may include any mobile device operable to store and run position determination software 124 for determining its position within the system 100. Examples of the mobile device 120 include a cellular phone, personal digital assistant, laptop, etc.

The mobile device 120 uses signals 112 transmitted from the beacons 110 to determine its position within the system 100. The beacons 110 may include a small device that broadcasts signals, such as the signals 112, into the environment of the system 100. Examples of the signals 112 include radio frequency signals, ultrasonic, and/or optical signals. The mobile device 120 receives the signals 112 through a receiver 122 from the beacons 110 within range. The mobile device 120 determines distances to one or more of the beacons 110 within range based on the received signals 112, and these distances along with positions of the beacons 110 downloaded from position database 130 are used by the position determination software 124 to determine the current position of the mobile device 120 in the system 100. Distances may be determined, for example, based on signal strength or time of flight. For example, a beacon may transmit both radio frequency and ultrasonic signals. The mobile device 120 receives the signals from the beacon. A distance to the beacon may be determined based on the difference in time of flight of the radio frequency signal and the ultrasonic signal. Also, signal strength of a received radio frequency signal may be used to estimate distance. Also, the position of the mobile device 120 may be determined using known triangulation algorithms using the positions of the beacons 110 downloaded from the position database 130.

The position of the mobile device 120 and the positions of the beacons 110 in the system 100 may be positions in a local coordinate system 140 for the system 100. The local coordinate system 140 is a coordinate system used to identify points within an n-dimensional space. For example, the local coordinate system 140 may be a 2-dimensional Cartesian coordinate system with an x-axis and a y-axis. In another example, a 3-dimensional coordinate system may be used to determine positions along a z-axis. The local coordinate system 140 is typically localized to a particular area, such as the area of a building where the beacons 110 are located. Details for the local coordinate system 140, such as the number of dimensions and the handedness of the coordinate system, may be assigned by a system administrator or software during set-up of the system 100. Also, after set-up and after the mobile device 120 receives the positions of the beacons 110 from the position database 130, the position determination software 124 may identify the current position of the mobile device 120 in the local coordinate system 140. Determining the positions of the beacons 110 within the local coordinate system 140 is described in detail below with respect to FIGS. 3-12.

The position database 130 stores the positions of the beacons 110 and may include a table, a database or any similar type of data structure. Also, the position database 130 is shown outside of the local coordinate system 140 as an example. The position database 130 may be provided in a computer at or near the beacons 110 where it is readily available to a user entering the system 100. In another example, the position database 130 may be available via the Internet.

Figure 2:
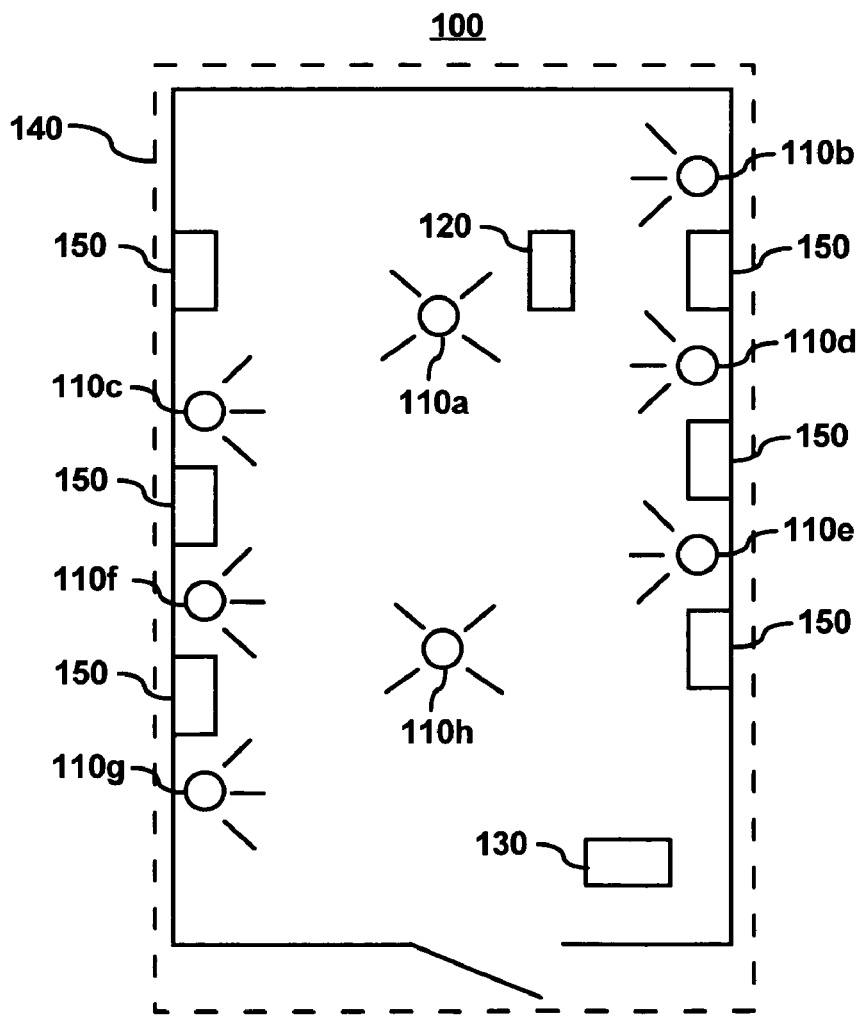
FIG. 2 illustrates another diagram of the passive location system, according to an embodiment.

The mobile device 120 may determine its position in the system 100, and then use its position to receive desired services. FIG. 2 shows an example of an application of the passive location system 100. In this example, the system 100 is implemented in a store selling products 150. A user of the mobile device 120 receives product information based on their position in the store. The beacons 110 are spaced throughout the store to provide a passive location system for the mobile device 120 entering the store. The mobile device 120 downloads positions of the beacons 110 and product information for the products 150 from the positions database 130. In one example, the positions database 130 is stored in a computer (not shown) in the store. The mobile device 120 connects to the computer via a wireless network to download the position and product information. In other examples, the mobile device 120 may download the position and product information from the Internet.

The mobile device 120, as shown in FIG. 2, is within range of the beacons 110 *a-h*. The mobile device 120 determines distances to the beacons 110*a-h* using signals received from the beacons 110*a-h*. The mobile device 120 also determines the positions of the beacons 110*a-h* from the beacon position information downloaded from the positions database 130. Using triangulation the mobile device 120 determines its position in the system 100. Based on the current position of the mobile device 120, the mobile device 120 may display certain product information. For example, if the mobile device 120 is in an electronic section of the store, the mobile device 120 displays sale information associated with electronic products of the products 150. This sale information is included in the product information previously downloaded from the position database 130. The store is one example of an application for the system 100. The system 100 may be used in any application where location of a user is relevant, such as targeted advertising in a mall, etc.

Prior to being able to determine a position of the mobile device 120 in the local coordinate system of the system 100, the mobile device 120 downloads the positions of the beacons 110 in the local coordinate system from the position database 130. Thus, the positions of the beacons 110 in the local coordinate system are previously determined and stored in the position database 130, such as during set-up of the system 100 or if the system 100 is modified.

Figure 3:
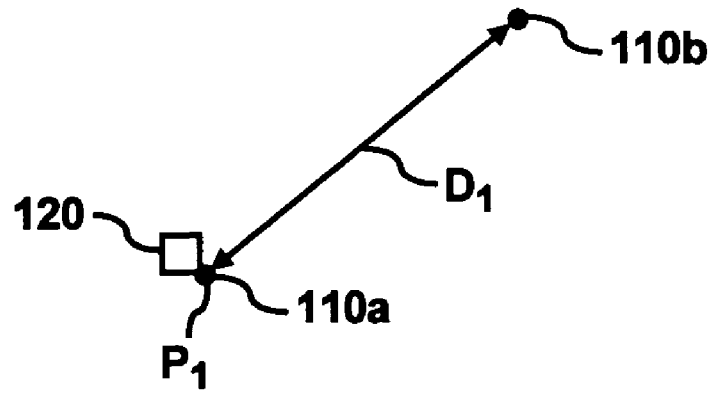
FIGS. 3-9 illustrate determining positions of beacons in a location system, according to embodiments.

FIGS. 3-7 illustrate determining positions of the beacons 110, according to the embodiments. In FIG. 3, beacons 110*a* and 110*b* are shown. The beacons 110*a* and 110*b* are placed at positions for use in a location system, such as the system 100 shown in FIGS. 1 and 2. Then, the positions of the beacons 110*a* and 110*b* are determined as shown and described in detail below. Other beacons 110, although not shown, may also be placed and the positions for those beacons are also determined.

The beacon 110*a* is assigned a position P1 in the local coordinate system 140. For example, the local coordinate system 140, shown in FIG. 1 and used in FIGS. 3-7, includes a 2-dimensional local coordinate system with an x and y-axis, and the beacon 110*a* is assigned coordinates in the local coordinate system 140, such as (0,0). The mobile device 120 is placed at the beacon 110*a* and a distance D1 is determined to the beacon 110*b* possibly using signals 112 transmitted from the beacon 110*b* and received by the mobile device 120. For example, distances may be determined based on signal strength or time of flight. A beacon may transmit both radio frequency and ultrasonic signals. The mobile device 120 receives the signals from the beacon. A distance to the beacon may be determined based on the difference in time of flight of the radio frequency signal and the ultrasonic signal. Also, signal strength of a received radio frequency signal may be used to estimate distance.

In the description below of FIGS. 3-12, the mobile device 120 is used for measuring distances between the beacons 110 and for determining the positions of the beacons 110 in the local coordinate system 140 using the measured distances. A block diagram of the mobile device 120 is shown in FIG. 13. The mobile device 120 shown and described with respect to FIGS. 3-13 uses software for determining the positions of the beacons 110 as described with respect to the methods shown in FIGS. 10-12. In FIGS. 1 and 2, the mobile device 120 includes position determination software 124 for determining the position of the mobile device 120 in the system 100 after the positions of the beacons 110 have been determined.

Figure 4:
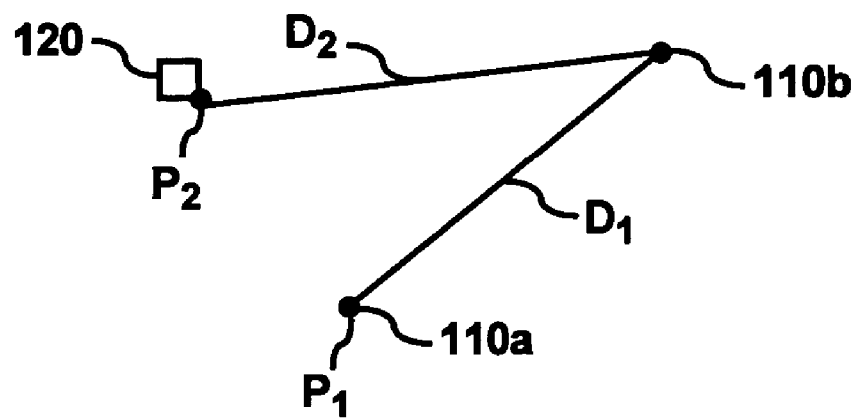

After determining the distance D1 shown in FIG. 3, the mobile device 120 is moved to a second position P2, shown in FIG. 4, with predetermined coordinates in the local coordinate system. A distance D2 is determined from the position P2 to the beacon 110b using the mobile device 120. Then, equation 1 is solved to determine possible positions for the beacon 110b in the local coordinate system.

$$\{(x-P1x)^2/D1=(y-P1y)^2/D1\}=\{(x-P2x)^2/D2=(y-P2y)^2/D2\}$$ Equation 1:

Equation 1 is solved to determine the intersection points of two circles with a radius of D1 and D2 respectively. The first section of equation 1, $\{(x-P1x)^2/D1=(y-P1y)^2/D1\}$, is the equation of a first of the two circles with a radius D1 and centered at point P1 having the coordinates (P1x, P1y) in the local coordinate system 140. Thus, the first section of equation 1 may be used to determine the points of the first circle in the local coordinate system 140. The second section of equation 1, $\{(x-P2x)^2/D2=(y-P2y)^2/D2\}$, is the equation of the second circle with a radius D2 and centered at point P2 having the coordinates (P2x, P2y) in the local coordinate system 140. Thus, the second section of equation 1 may be used to determine the points of the second circle in the local coordinate system 140. The points of the first circle that are equal to the points of the second circle are the intersection points of the two circles.

Figure 5:
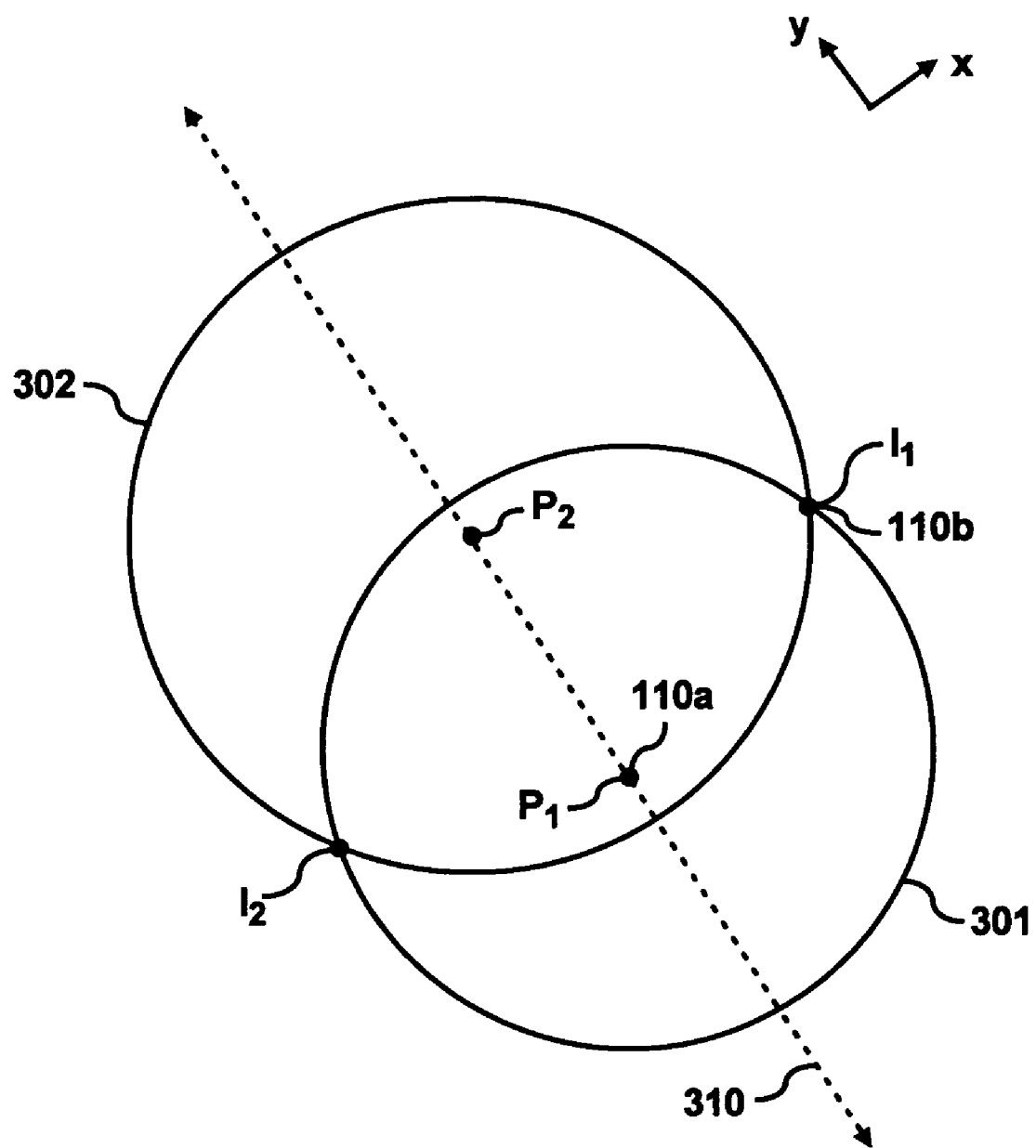

FIG. 5 shows the two circles as circle 301 having a radius D1 and centered at P1, and circle 302 having a radius D2 and centered at P2. The position of the beacon 110b in the local coordinate system 140 is at an intersection of the two circles 301 and 302. However, the squared terms in equation 1 result in two solutions to equation 1, as both positive and negative values square to the same value. Graphically, the two intersection points are shown in FIG. 5 as the two intersection points I1 and I2. The intersections points I1 and I2 are reflections of each other across the dashed line 310 through points P1 and P2.

The next step is to determine which of the intersection points I1 or I2 is the position of the beacon 110b in the local coordinate system 140. As described above, two possible positions were computed for the beacon 110b, shown as intersection points I1 and I2. Either of the computed positions may be used, depending on the selected handedness of the local coordinate system 140. A coordinate system may be left-handed or right-handed. For example, a 2-dimensional, right-handed, coordinate system may have the positive x-axis moving to the right, and a 2-dimensional, left-handed, coordinate system may have the positive x-axis moving to the left.

In one embodiment, the handedness of the local coordinate system 140 is selected prior to determining the positions of the beacons 110. For example, the local coordinate system 140 may be based on the walls or floors of the store for the system 100 shown in FIG. 2, or the local coordinate system 140 may be arbitrarily selected.

In another embodiment, the handedness of the local coordinate system 140 is selected when determining the positions of the beacons 110. For example, the positions of P1 and P2 are determined. The position P1 in the local coordinate system 140 may be arbitrarily selected as (X, Y). The position P2 is determined relative to P1. For example, P2 is assigned on the same Y-axis, e.g., reflection line 310 drawn through the positions P1 and P2, as the position P2. Then, the X and Y coordinates of the position P2 in the local coordinate system 140 may be determined by measuring distances to the position P2 or by measuring distances from the positions P1 and P2 to the beacon 110b. The handedness of the local coordinate system 140 is selected by moving the mobile device 120 in a positive axis direction for the selected handedness. For example, referring to FIG. 6, a right-handed coordinate system is selected, and thus, the mobile device 120 is moved to the right of the reflection line 310 in the direction 401. The direction 401 is selected such that the direction vector 401 has a positive X value when projected onto the X axis of the local coordinate system 140, which in this example is to the right of the reflection line 310. Thus, the positive X-axis direction 401 is selected based on the desired handedness.

Figure 6:
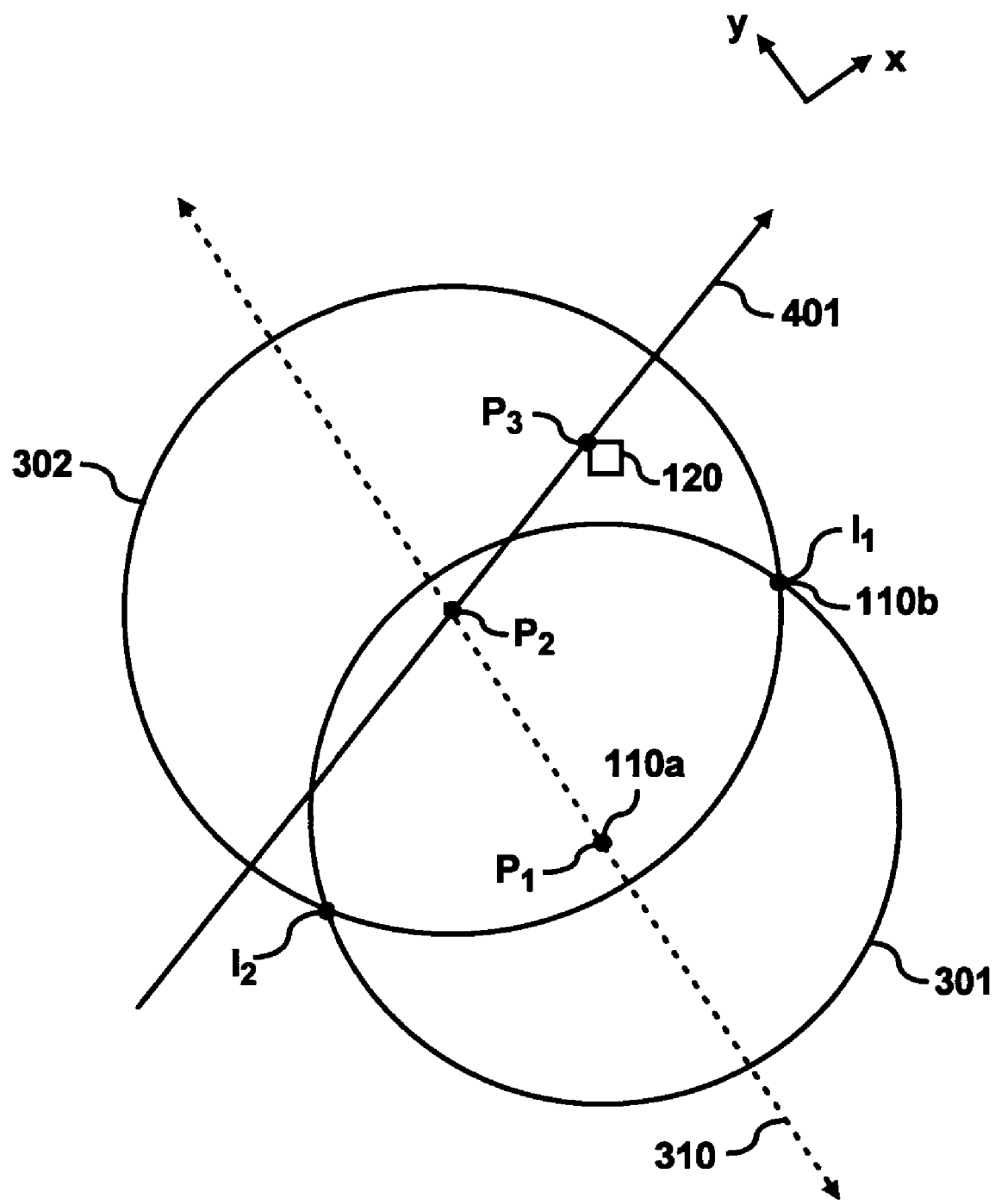

Irrespective of the method selected for determining the local coordinate system 140, as shown in FIG. 6, the mobile device 120 is moved in a direction 401 with a positive X magnitude when projected onto the X axis of the local coordinate system 140 to a new position P3. The geometry of FIG. 7 dictates that, as the intersection points I1 and I2 are reflections of each other about axis 310, then position P3 is closer to one of intersection points I1 or I2 than position P2 and further from the other.

Next, the distance D2 from position P2 to beacon 110b and the distance $D_b$ from position P3 to beacon 110b are determined using the mobile device 120 and compared. Just as the geometry of the setup results in the position P3 being closer to one of the intersection points I2 or I3 than position P2, position P3 is either closer or further to beacon 110b than position P2. Note that this analysis can be applied with knowing the actual position P3 in the coordinate system 140. Using the positions of P2 and the intersection points I1 and I2, and distances D2 and $D_b$, the position of the beacon 110b in the local coordinates system 140 may be determined as follows:

If (P3 is closer to I1) and (D2 is greater than $D_b$), then beacon 110b is at position I1;

If (P3 is closer to I2) and (D2 is greater than $D_b$), then beacon 110b is at position I2;

If (P3 is closer to I1) and (D2 is less than $D_b$), then beacon 110b is at position I2;

If (P3 is closer to I2) and (D2 is less than $D_b$), then beacon 110b is at position I1.

The position of a third beacon and subsequently the positions of all the remaining beacons in the system 100 may be established by repeating the steps above, including solving equation 1 for each beacon and selecting one of the intersection points as the position for the beacon whose position is currently being determined. In another embodiment, instead of repeating the steps described above, another algorithm is used that utilizes the positions of the beacons 110a and 110b determined above to more rapidly converge on the position of a third beacon, such as the beacon 110c shown in FIG. 7, and subsequently all the remaining beacons in the system 100.

Figure 7:
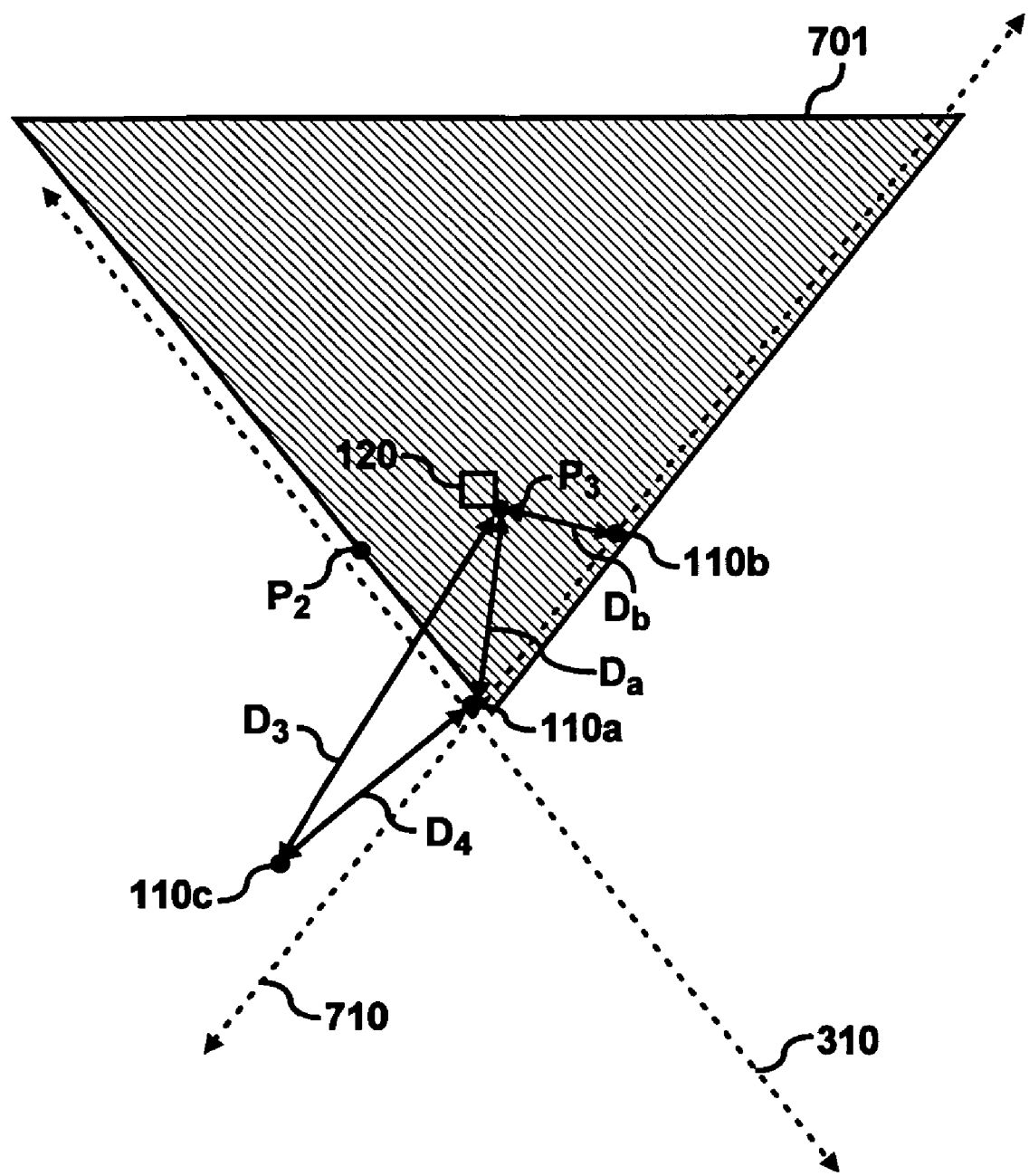

FIG. 7 shows the beacons 110a-c. Based on the previous determinations, the position of the beacons 110a and 110b are known. The position of the mobile device 120 at P3 can also be determined. In general, triangulation on a plane requires three distances to fix a position in the plane. However, in this instance, the mobile node 120 may determine its position using only the two currently known beacon positions for the beacons 110a and 110b. In particular, the trajectory following the direction 401 shown in FIG. 6 and shown as 710 in FIG. 7 allows one to make some assumptions about the position of the mobile device 120 with respect to the beacons. As long as the mobile device 120 remains in the shaded area 701 and does not cross the line 710 as the mobile device 120 is moved in the positive X-axis direction, the mobile device 120 may use the positions of the beacons 110a and 110b to find its position through triangulation. Then, when solving equation 1 for the two circles about beacons 110a and 110b to determine the position of P3 in the local coordinate system 140, two possible positions are determined. The false solution is not included in the shaded region 701 and the correct solution is included in the shaded region 701.

The position determination software 124 in the mobile device 120 determines whether the mobile device 120 crosses the line 710 as the mobile device 120 is moved in the positive X-axis direction by periodically comparing the distances Da and Db shown in FIG. 7 to the distance between the beacons 110a and 110b (Dab). If Da+Db is equal to Dab, then the mobile device 120 has crossed line 710 (or at least is very close) and the mobile device 120 should be relocated to a position within the shaded area 701.

As shown in FIG. 7, a distance D3 from the mobile device 120 to the beacon 110c is determined, and a distance D4 from the beacon 110a to the beacon 110c is determined. Although not shown, the mobile device 120 may be moved to the position of the beacon 110a to determine the distance D4 to the beacon 110c. Using the distances D3 and D4, two possible positions (I3 and I4) of the beacon 110c in the local coordinate system 140 are determined as shown in FIG. 8.

Figure 8:
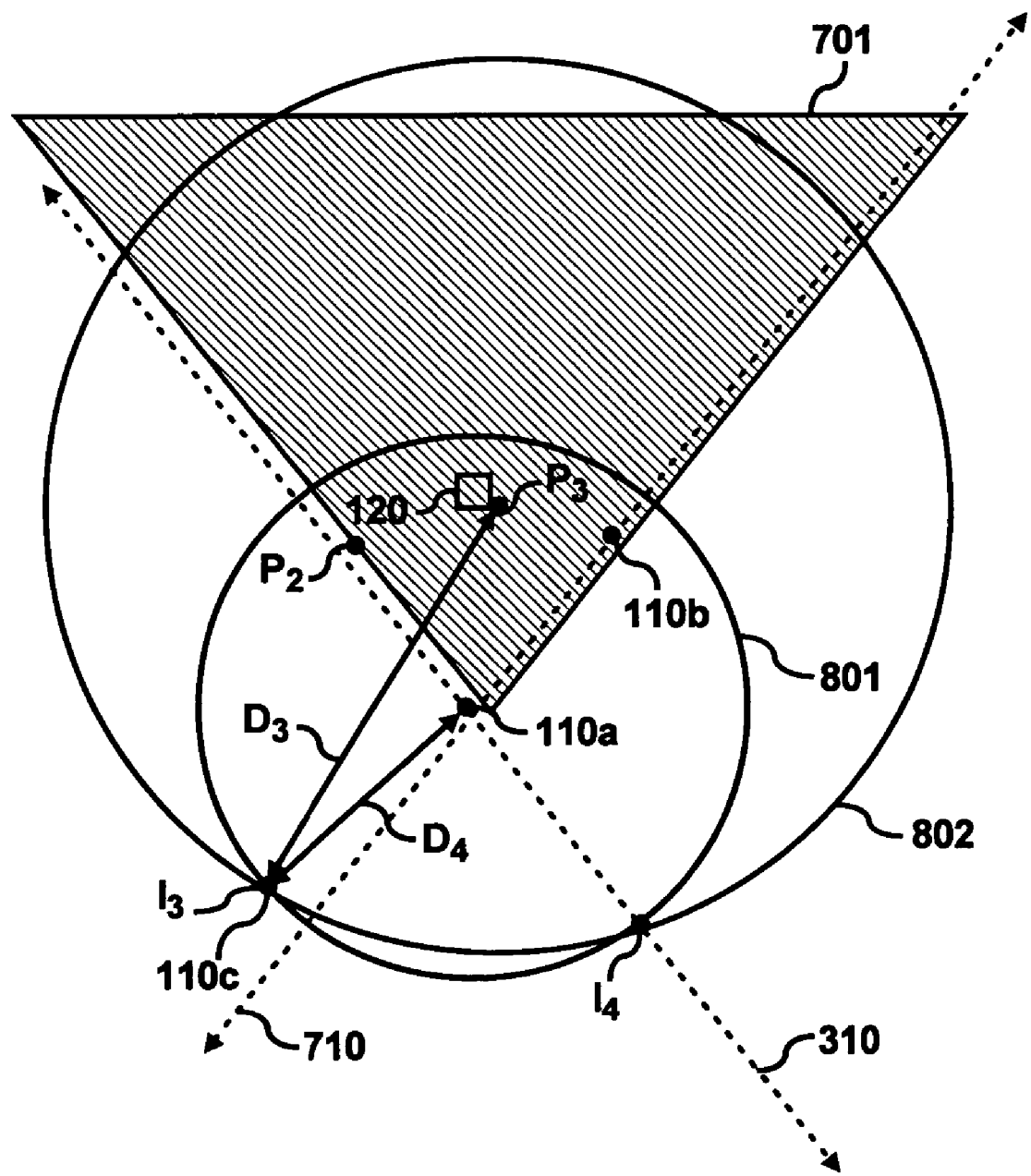

As shown in FIG. 8, two circles 801 and 802 are calculated. The circle 801 is centered on the position of the beacon 110a and has a radius D4. The circle 802 is centered on the position of the mobile device 120 at P3 and has a radius D3. Based on equation 1, the beacon 110c is at one of the two intersection points I3 and I4 of the circles 801 and 802. Only one of the intersection points I3 and I4 is correct.

Figure 9:
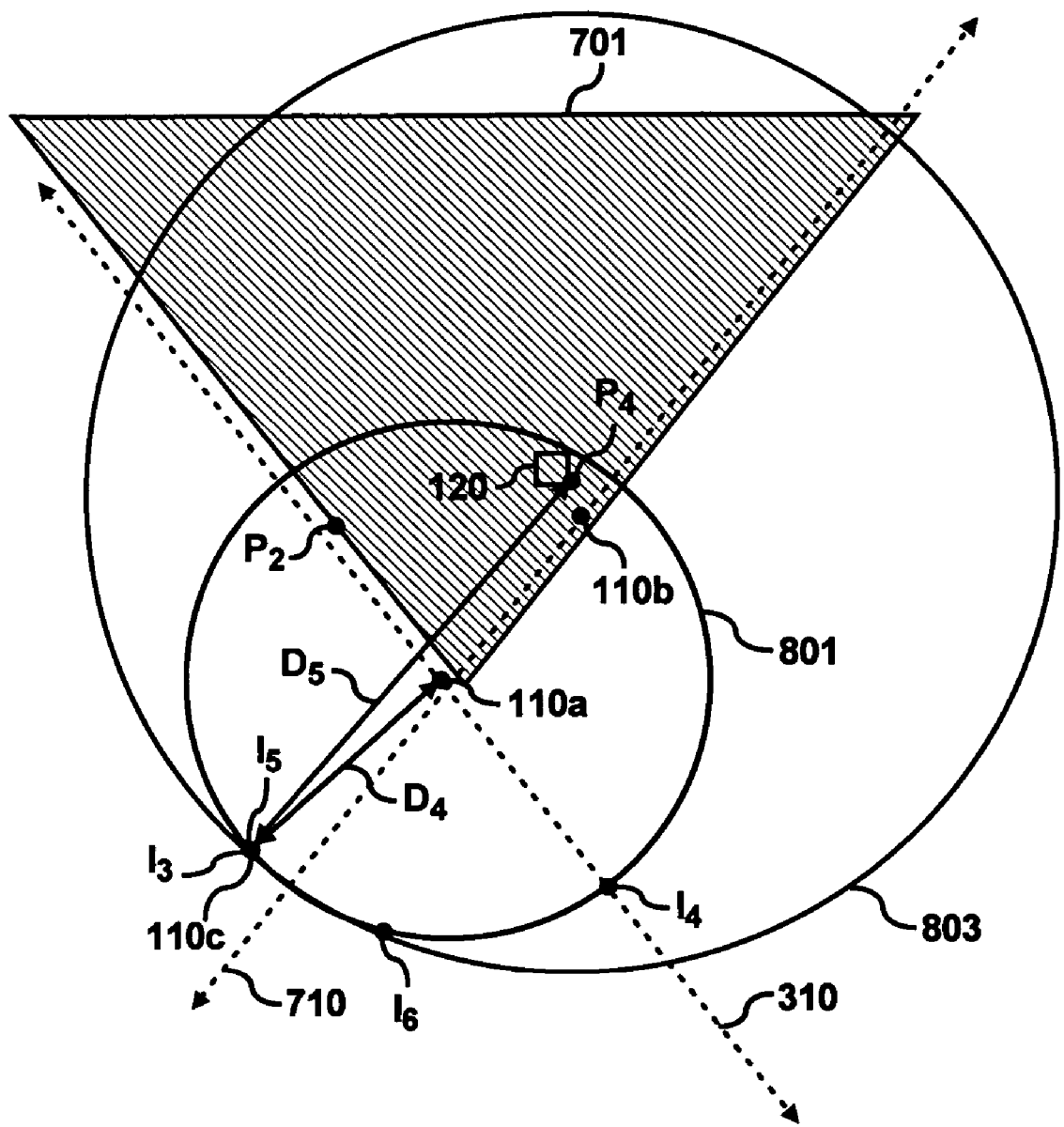

Identifying which of the intersection points I3 and I4 is the true position of the beacon 110c rather than the false reflection point can rapidly be performed by moving the mobile device 120 from the position P3, and re-measuring the distance to the beacon 110c. Small changes in position of the mobile device 120 typically results in large movement in the position of one of the intersections I3 or I4 of the circles 801 and 802, while the position of the other intersection point remains substantially unchanged. The intersection point remaining substantially unchanged is the true position of the beacon 110c. This technique is illustrated in FIG. 9 which shows the mobile device 120 moved to a new position P4 and the new intersection point I5 resulting from the moved mobile device 120. In FIG. 9, the circle 801 is unchanged because it is calculated from the position of the beacon 110a and the radius D4. The circle 805 is changed from the circle 803 because of the new center point P4 and the new radius D5. The intersection points of the circles 801 and 805 are shown as I5 and I6. Note that the intersection point I5 and I3 are the same, but the intersection point I6 moved a relatively substantial distance from the intersection point I4. In other words, the intersection point I5 remains at substantially the same position in the local coordinate system 140 as the intersection point I3, and the intersection point I6 is at a position in the local coordinate system 140 that is a relatively substantial distance from the intersection point I4. Thus, the intersection point I3 is the true position of the beacon 110c in the local coordinate system 140 while the intersection point I4 is the false reflection point.

Using this technique, the position of the beacon 110c can rapidly be determined. Furthermore, by repeating the algorithm described above and shown in FIGS. 7-9, positions of the remaining beacons in the system 100 can rapidly be determined. However, instead of using two beacons to determine the position of the mobile device 120 (such as shown in the shaded area 701 of FIG. 7), the positions of three beacons are used to triangulate the position of the mobile device 120. The newly computed positions of the beacons are stored in the positions database 130 shown in FIG. 1. Then, a mobile device in the system 100 may download the positions of the beacons to determine its position in the local coordinate system of the system 100.

The beacon position determination examples described with respect to FIGS. 3-9 solve for positions in a plane, such as a 2-dimensional local coordinate system. Intersection points in a plane are identified as positions of beacons. In certain instances, planar geometry may not be sufficient for position determination. In those instances, steps described above and in further detail below remain substantially the same. However, the intersection of spheres (instead of circles) for triangulation is determined, which increases the number of predetermined or known positions needed for triangulation by one. For example, four predetermined positions are needed to establish the position of the mobile device 120.

Figure 10:
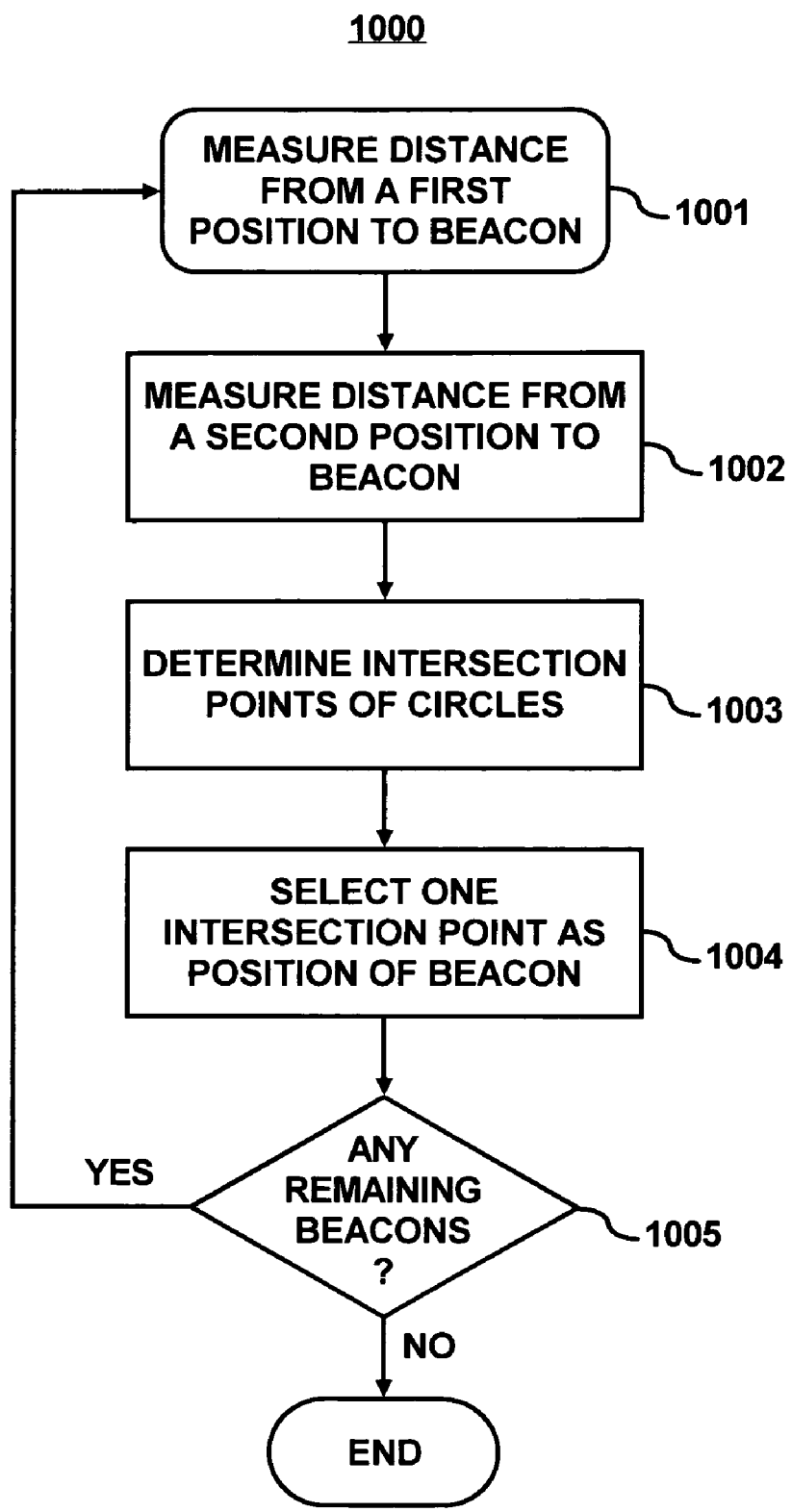
FIG. 10 illustrates a flow chart of a method for determining the positions of beacons, according to an embodiment.

FIG. 10 is a flow chart of a method 1000 for determining the positions of beacons in a local coordinate system, according to an embodiment. The method 1000 is described with respect to FIGS. 1-6 by way of example and not limitation. At step 1001, the mobile device 120 measures a distance D1 from a first position P1 in the local coordinate system 140 to the beacon 110b, as shown in FIG. 3. At step 1002, the mobile device 120, measures a distance D2 to the beacon 110b from a second position P2, as shown in FIG. 4.

At step 1003, the mobile device 120 determines intersection points I1 and I2 of circles 301 and 302 shown in FIG. 5. At step 1004, the mobile device 120 selects one of the intersection points I1 or I2 as the position of the beacon 110b in the local coordinate system 140. For example, the handedness of the local coordinate system 140 is selected and one of the intersection points I1 or I2 is determined to be the position of the beacon 110b based on the selected handedness.

At step 1005, if positions for any more of the beacons 110 need to be determined one or more of the steps 1001-1004 are repeated for each beacon. In another embodiment, described in a method 1100, instead of repeating the steps of the method 1000, steps relating to FIGS. 7-9 may be performed to find the positions of additional beacons.

Figure 11A:
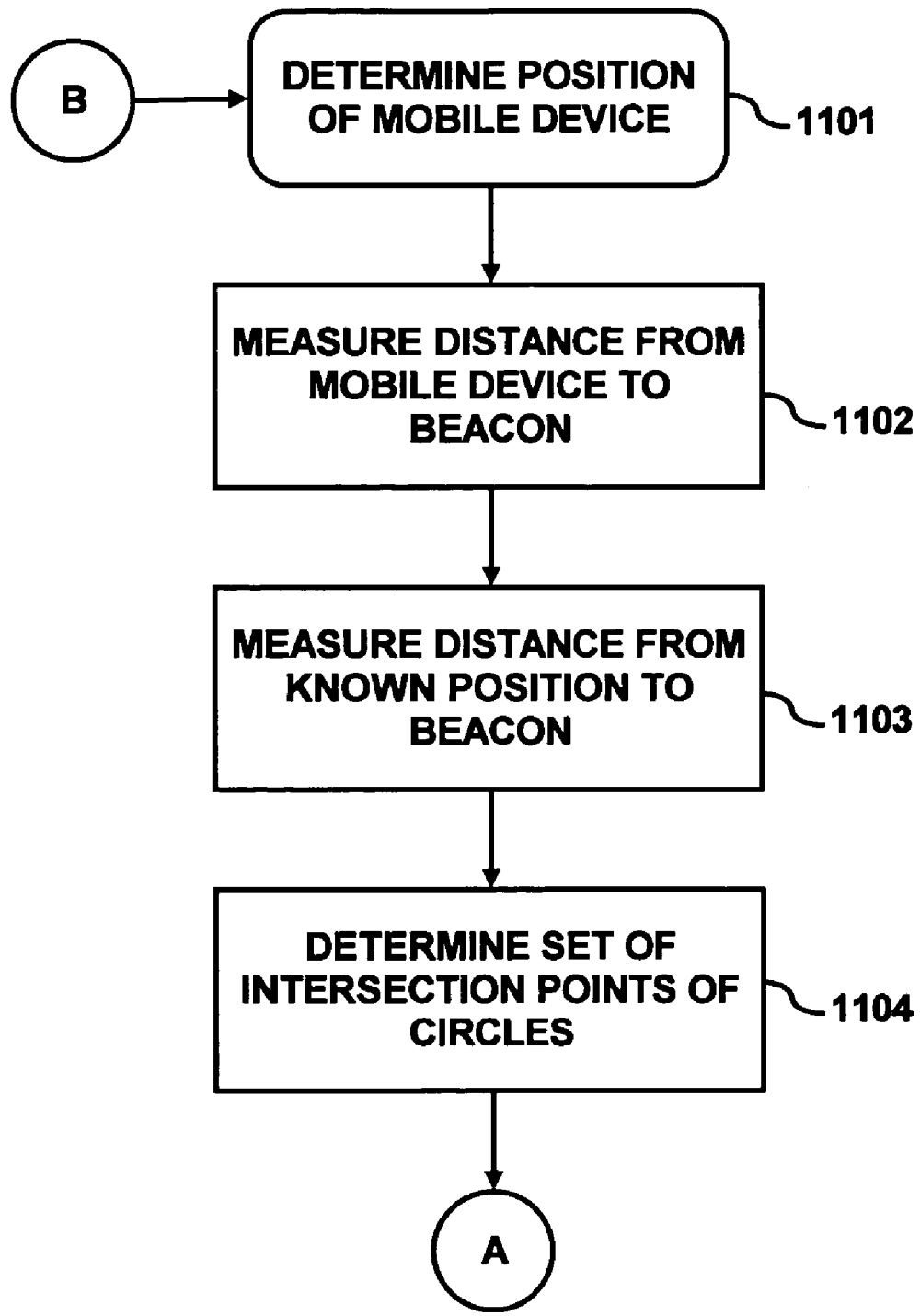
FIGS. 11A-B illustrate flow charts of determining the positions of beacons, according to another embodiment.
Figure 11B:
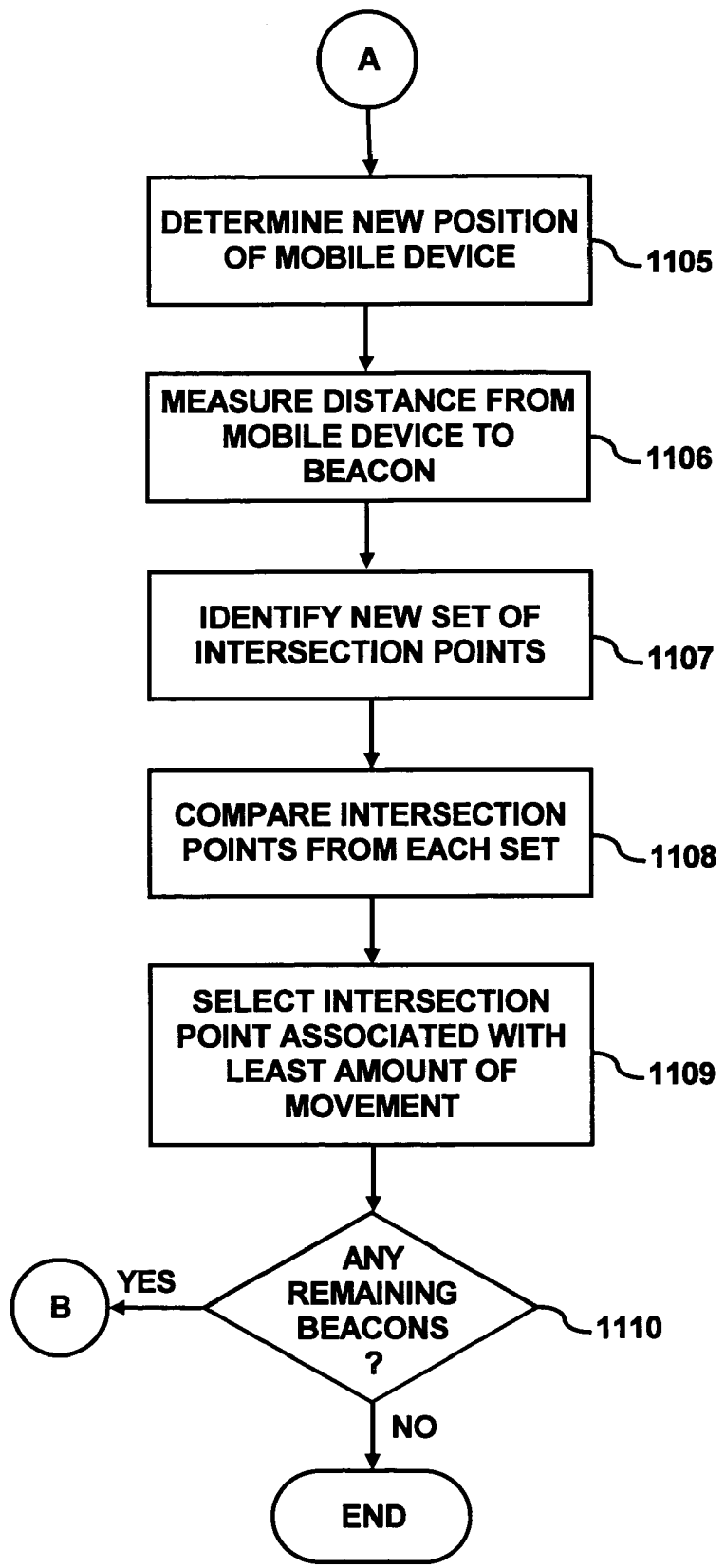

The method 1100 shown in FIGS. 11A-B provides steps for determining positions of beacons, according to another embodiment. The method 1100 is described with respect to FIGS. 7-9 by way of example and not limitation. At step 1101, the mobile device determines its position at P3, shown in FIG. 7 through triangulation. In FIG. 7, the positions of the beacons 110a and 110b are known and the position of P3 may be determined based on the estimation of the points in the shaded area 701 of local coordinate system 140.

At step 1102, the mobile device 120 measures the distance D3 from P3 to the beacon 110c. At step 1103, the mobile device 120 measures the distance D4 from a known position, such as the position of the beacon 110a previously assigned, to the beacon 110c. The distance D4 may be measured when first starting the process, such as after measuring the distance D1 shown in FIG. 3. This is preferred as it means that the mobile device 120 does not have to move back to the position of the beacon 110a to measure D4. This is also why the circle 801 is centered about the position of the beacon 110a, and re-used in both FIGS. 8 and 9.

At step 1104, the mobile device 120 determines a set of intersection points, such as I3 and I4 shown in FIG. 8, for the circles 801 and 802. The circles 801 and 802 are centered at the position of the beacon 110a and the position P3 respectively. The circle 801 has a radius equal to the distance D4 and the circle 802 has a radius equal to D3.

At step 1105, the mobile device 120 is moved to a new location away from P3. For example, the mobile device 120 is moved to the position P4 and determines the position of P4 in the local coordinate system 140. At steps 1106, the mobile device 120 measures the distance D5 from the position P4 to the beacon 110c.

At step 1107, the mobile device 120 determines a set of new intersection points for the circles 801 and 803 shown in FIG. 9. The circles 801 and 803 are centered at the position of the beacon 110a and the position P4 respectively. The circle 801 has a radius equal to the distance D4 and the circle 803 has a radius equal to D5.

At step 1108, the mobile device 120 compares the intersection points from each set determined at steps 1107 and 1104. At step 1109, the mobile device 120 selects one of the intersection points associated with the least amount of movement as the position of the beacon 110c in the local coordinate system 140. For example, the intersection points I3-I6 are shown in FIG. 9. The intersection points I3 and I4 are the first set of intersection points and the intersection points I5 and I6 are the second set of intersection points. The intersection points I3 and I5 are substantially the same, while the intersection points I4 and I6 are relatively, substantially spaced apart. Thus, a small movement of the mobile device 120 from the position P3 to the position P4 results in substantial movement between the intersection points I4 and I6, while the other associated intersection points I3 and I5 are substantially the same. The intersection point I3 is selected as the position of the beacon 110c because I3 is associated with the least amount of movement between respective intersection points.

At step 1109, if positions need to be determined for any remaining beacons 110 in the system 100, then the steps 1101-1109 are repeated for each remaining beacon based in part on distances measured from two positions of the mobile device 120, such as the positions P3 and P4 shown in FIGS. 7-9.

Figure 12:
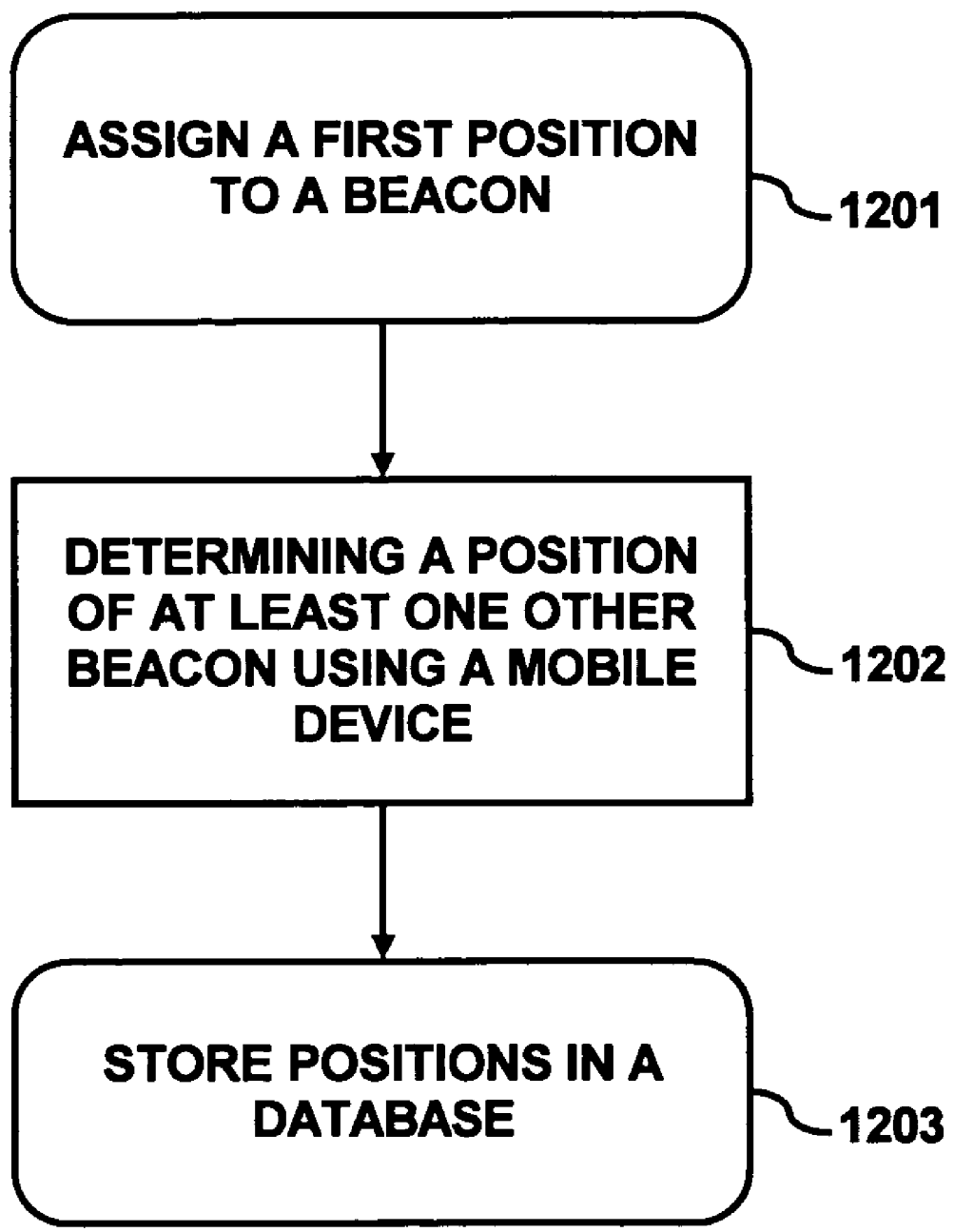
FIG. 12 illustrates a flow chart of a method for building a position database, according to an embodiment.
Figure 13:
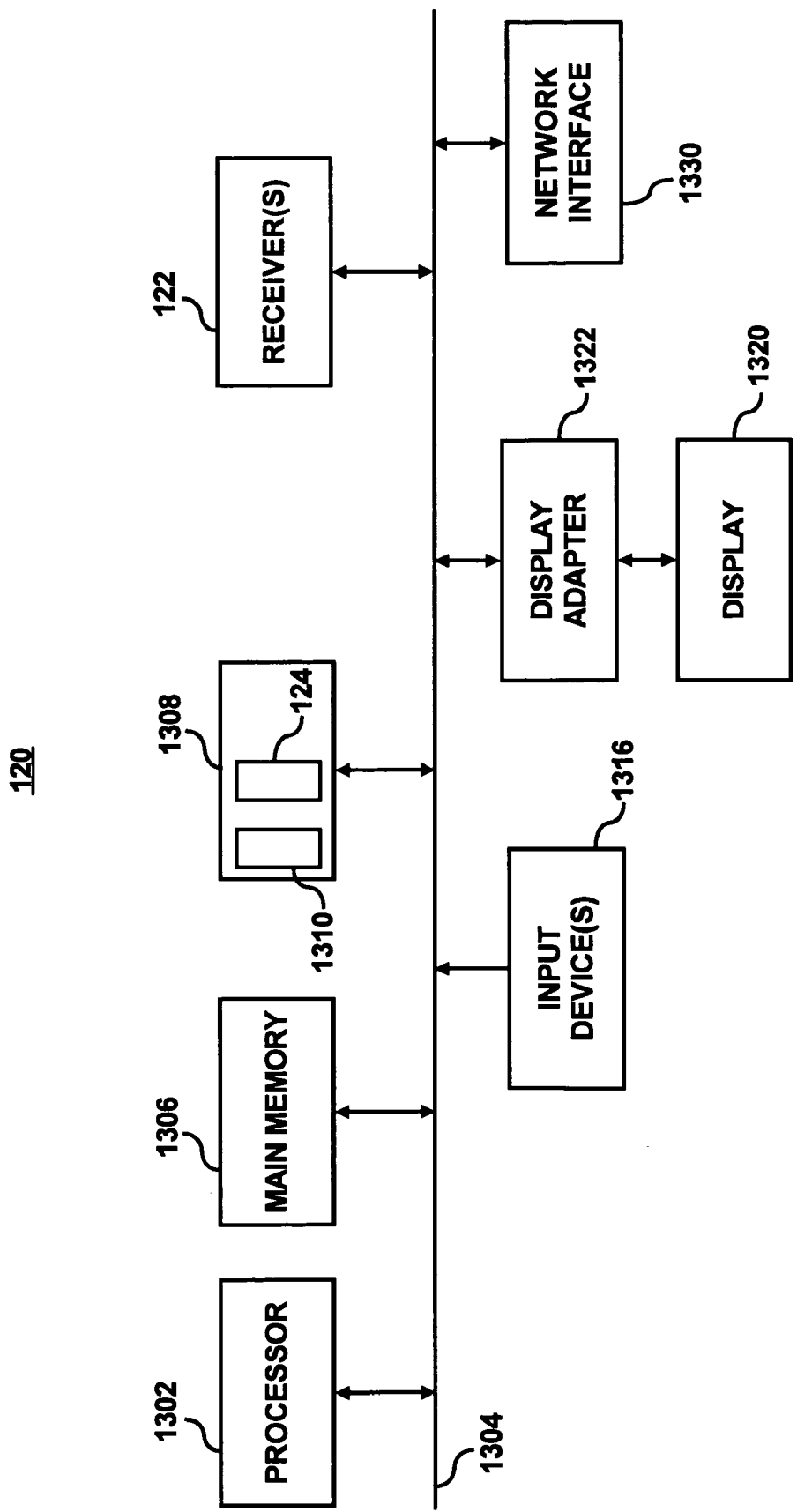
FIG. 13 illustrates a block diagram of a device operable to determine the position of a beacon, according to an embodiment.

FIG. 12 illustrates a method 1200 for building a position database, according to an embodiment. At step 1201, the beacon 110a is assigned to a position in the local coordinate system 140, such as shown in FIG. 3. At step 1202, the mobile device 120 determines positions for at least one other beacon in the system 100. For example, using one or more of the methods 1000-1100, the positions of possibly all the remaining beacons in the system 100 are determined. At step 1203, the mobile device 120 transmits the positions of the beacons 110 to the position database 130 shown in FIG. 1, where the positions are stored for later retrieval. The positions of the beacons 110 may be downloaded by mobile devices for use in determining their positions in the system 100.

Many of the steps of the methods 1000-1200 are described with respect to the mobile device 120 performing a respective step. However, it will be apparent to one of ordinary skill in the art that after necessary measurements are taken using the mobile device 120, these measurements may be transmitted to another device including hardware or a combination of hardware and software for determining the positions of the beacons 110 in the system 100.

FIG. 13 illustrates a block diagram of a mobile device 120 that may be used to perform many of the steps of the methods 1000-1200. The mobile device 120 includes a processor 1302 providing an execution platform for implementing many of the steps of the methods 1000-1200. These steps, for example, may be implemented as beacon position determination software 1310 executed by the processor 1302 and stored in the nonvolatile memory 1308. Position determination software 124, such as described above with respect to FIG. 1, may also be stored in the memory 1308. The mobile device 120 also includes a main memory 1306, such as a Random Access Memory (RAM). Commands and data from the processor 1302 are communicated over a communication bus 1304. A user interfaces with one or more input devices 1316. A display 1320 is also provided. A display adaptor 1322 interfaces with the communication bus 1304 and receives display data from the processor 1302 and converts the display data into display data for the display 1320. The display adaptor 1322 may also send input commands received via the display 1320 operating as a touch pad to the processor 1302 as needed. Also, one or more receivers 122 may be used to receive the signals 112 shown in FIG. 1 for determining distance. A network interface 1330 may be provided for communicating with the position database 130 shown in FIG. 1. It will be apparent to one of ordinary skill in the art that the mobile device 120 may include other components not shown and some of the components shown may be optional, such as the network interface 1330.

What has been described and illustrated herein are embodiments of the invention. The terms, descriptions and figures used herein are set forth by way of illustration only and are not meant as limitations. Those skilled in the art will recognize that many variations are possible within the spirit and scope of the invention.

What is claimed is:

1. A method for determining a position of at least one beacon in a local coordinate system for a location system, the method comprising:
   measuring a first distance from a first position in the local coordinate system to a first beacon;
   measuring a second distance from a second position in the local coordinate system to the first beacon;
   determining intersection points of a first circle and a second circle in the local coordinate system, wherein the first circle is centered at the first position and has a radius substantially equal to the first distance and the second circle is centered at the second position and has a radius substantially equal to the second distance; and
   selecting one of the intersection points as a position of the first beacon in the local coordinate system.

2. The method of claim 1, wherein measuring a first distance further comprises:
   measuring the first distance using a mobile device receiving at least one signal from the first beacon.

3. The method of claim 2, wherein measuring a second distance further comprises:
   measuring the second distance using the mobile device receiving the at least one signal from the first beacon.

4. The method of claim 3, wherein the at least one signal comprises at least one of a radio frequency signal, an ultrasonic signal, and an optical signal.

5. The method of claim 1, wherein determining intersection points further comprises:
   calculating points for the first circle in the local coordinate system.

6. The method of claim 5, wherein determining intersection points further comprises:
   calculating points for the second circle in the local coordinate system.

7. The method of claim 1, wherein selecting one of the intersection points as a position of the first beacon in the local coordinate system further comprises:
   selecting a handedness of the local coordinate system; and selecting one of the intersection points as a position of the first beacon in the local coordinate system based on the selected handedness of the coordinate system.

8. The method of claim 1, further comprising:
determining a position of at least one other beacon in the local coordinate system.

9. The method of claim 8, wherein determining a position of at least one other beacon in the local coordinate system further comprises:
measuring a distance from one position in the local coordinate system to a second beacon;
measuring another distance from another position in the local coordinate system to the second beacon;
determining a second set of intersection points of two circles in the local coordinate system, wherein the two circles are associated with at least one of the measured distance from the one position, the measured distance from the another position, and the one and the another positions; and
selecting one intersection point from the second set of intersection points as a position of the second beacon in the local coordinate system.

10. The method of claim 8, wherein determining a position of at least one other beacon in the local coordinate system further comprises:
determining a position of a second beacon based on three known positions in the local coordinate system.

11. The method of claim 8, wherein determining a position of at least one other beacon in the local coordinate system further comprises:
determining a position of a mobile device in the local coordinate system;
measuring a third distance from the position of the mobile device to a second beacon;
measuring a fourth distance from the first position to the second beacon;
determining a second set of intersection points of two circles in the local coordinate system, wherein the two circles are associated with at least one of the third distance, the fourth distance, the position of the mobile device, and the first position; and
determining which of the second set of intersection points is a position of the second beacon in the local coordinate system.

12. The method of claim 11, wherein determining which of the second set of intersection points is a position of the second beacon in the local coordinate system further comprises:
measuring a fifth distance from a new position of the mobile device to the second beacon;
determining a third set of intersection points of two new circles in the local coordinate system, wherein the two new circles are associated with at least one of the fifth distance, the fourth distance, the new position of the mobile device, and the first known position; and
determining which of the second set of intersection points is a position of the second beacon in the local coordinate system based on the second and third set of intersection points.

13. The method of claim 12, wherein determining which of the second set of intersection points is a position of the second beacon in the local coordinate system based on the second and third set of intersection points further comprises:
determining which of the intersection points of the third set of intersection points moved a least distance from a respective intersection point of the second set of intersection points; and identifying an intersection point of the second set of intersection points associated with the intersection point of the third set of intersection points that moved the least distance as the position of the second beacon in the local coordinate system.

14. The method of claim 11, wherein determining a position of a mobile device in the local coordinate system further comprises:
determining the position of the mobile device based on two known positions in the local coordinate system and an estimate of another position in the local coordinate system.

15. A computer readable medium on which is embedded one or more computer programs, said one or more computer programs implementing a method for determining a position of at least one beacon in a local coordinate system for a location system, the method comprising:
determining a first distance from a first position in the local coordinate system to a first beacon;
determining a second distance from a second position in the local coordinate system to the first beacon;
determining intersection points of a first circle and a second circle in the local coordinate system, wherein the first circle is centered at the first position and has a radius substantially equal to the first distance and the second circle is centered at the second position and has a radius substantially equal to the second distance; and
storing one of the intersection points as a position of the first beacon in the local coordinate system.

16. The computer readable medium of claim 15, wherein the method further comprises:
calculating a distance from one position in the local coordinate system to a second beacon;
calculating another distance from another position in the local coordinate system to the second beacon;
determining a second set of intersection points of two circles in the local coordinate system, wherein the two circles are associated with at least one of the measured distance from the one position, the measured distance from the another position, and the one and the another positions; and
identifying one intersection point from the second set of intersection points as a position of the second beacon in the local coordinate system.

17. The computer readable medium of claim 15, wherein the method further comprises:
determining a position of a second beacon based on three known positions in the local coordinate system.

18. The computer readable medium of claim 15, wherein the method further comprises:
determining a position of a mobile device in the local coordinate system;
calculating a third distance from the position of the mobile device to a second beacon;
calculating a fourth distance from the first position to the second beacon;
determining a second set of intersection points of two circles in the local coordinate system, wherein the two circles are associated with at least one of the third distance, the fourth distance, the position of the mobile device, and the first position;
determining which of the second set of intersection points is a position of the second beacon in the local coordinate system.

* * * * *